Figure 1:
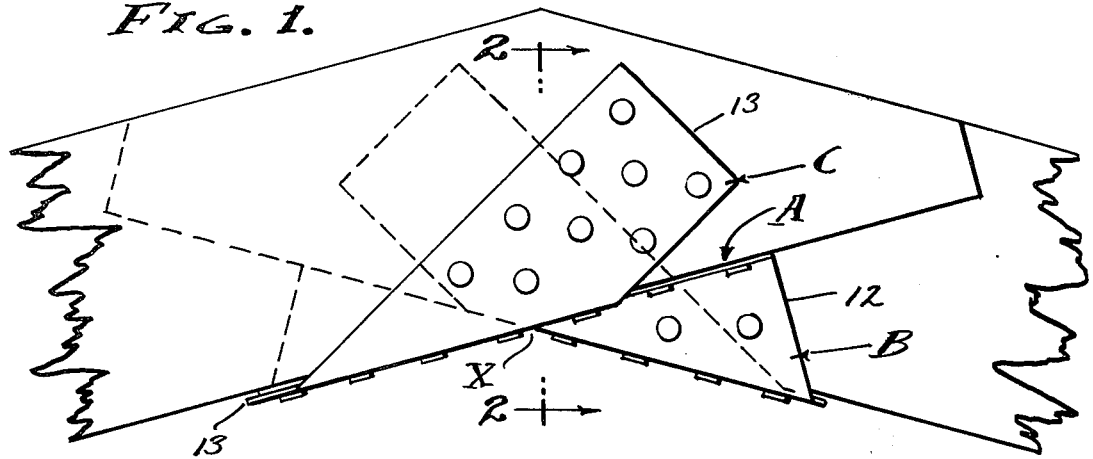

United States Patent [19]
Smith

[11] 3,950,109
[45] Apr. 13, 1976

[54] COUPLING FOR ANGULARLY RELATED BEAMS

[76] Inventor: Wayburn S. Smith, 1340 Engracia Ave., Torrance, Calif. 90501

[22] Filed: May 1, 1975

[21] Appl. No.: 573,398

[52] U.S. Cl. .................. 403/403; 403/382; 52/752
[51] Int. Cl.² ......................................... F16B 7/00
[58] Field of Search ........... 403/403, 205, 231, 232, 403/382; 52/752, 753 L, 753 C, 751, 713, 715

[56] References Cited
UNITED STATES PATENTS

| | | | |
|---|---|---|---|
| 2,413,362 | 12/1946 | Maxwell et al. | 403/403 |
| 2,840,014 | 6/1958 | Wadsworth et al. | 52/753 L |
| 3,229,333 | 1/1966 | Hillesheim et al. | 403/231 |
| 3,281,168 | 10/1966 | Dufficy | 403/232 |
| 3,423,898 | 1/1969 | Tracy et al. | 52/753 L X |

*Primary Examiner*—Andrew V. Kundrat

[57] ABSTRACT

A coupling for establishing structural continuity between two angularly related beams, and in particular roof rafters and the like, and comprised of identical complementary members and each fabricated from rectangular sheet partially sheared and formed along a line to establish an angle with a bearing plate and flange plate for engagement with overlapped beam ends respectively, and bent along parallel lines angularly disposed to the first mentioned line to establish a strap plate integral with said flange plate and embracing the bearing plate of the complementary coupling member and beam engaged thereby, the plates being secured to said beams by shear fasteners.

11 Claims, 7 Drawing Figures

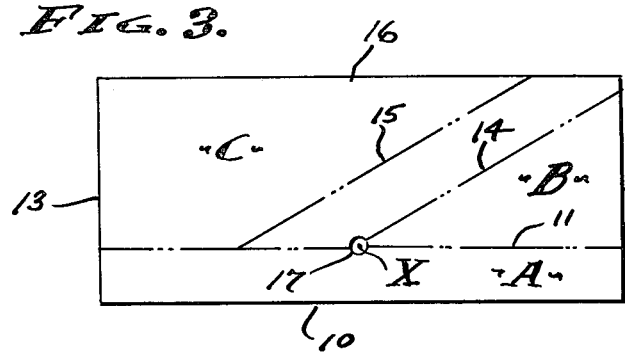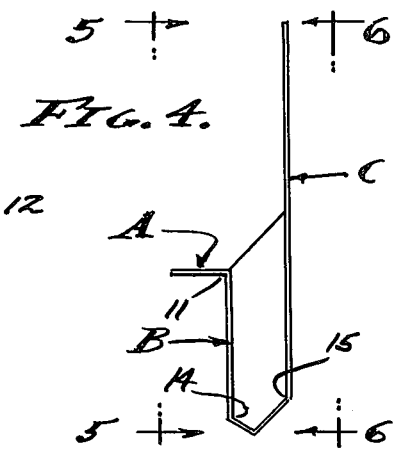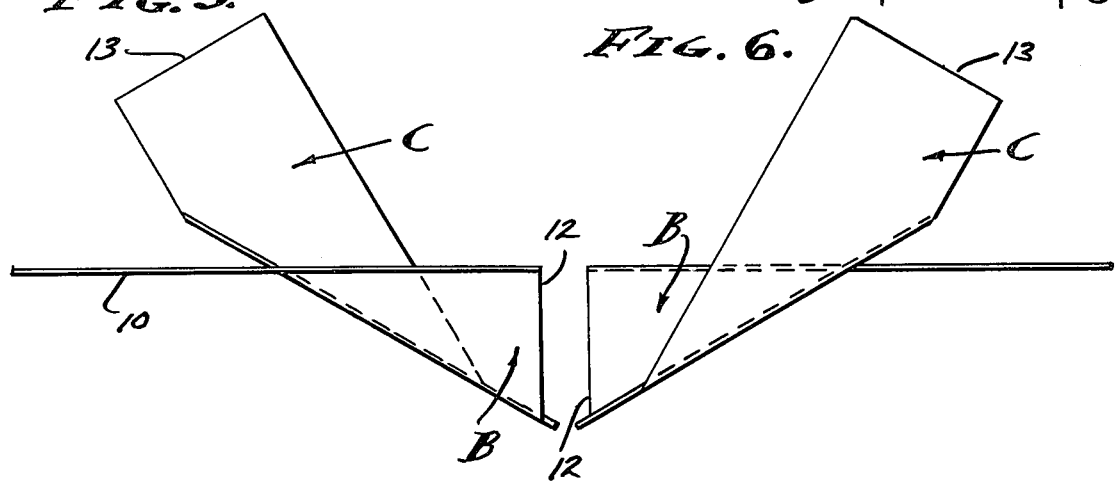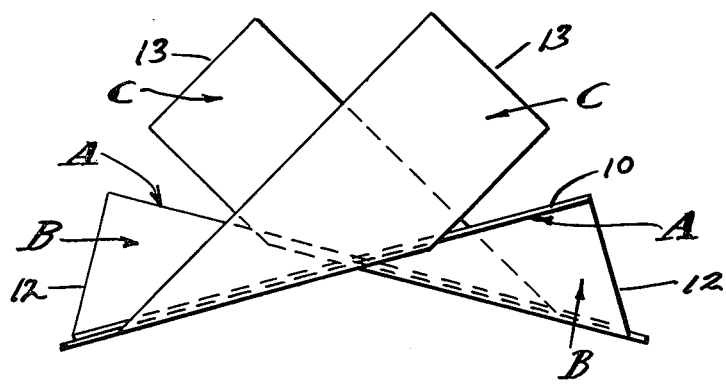

COUPLING FOR ANGULARLY RELATED BEAMS

BACKGROUND

The frame works of buildings and like structures most often involve trusses for the support of decks and in particular roofs that are pitched. The simplest example of a truss is the principal or main coupling of a roof, in which a horizontal tie beam is suspended in the middle by a king post to the apex of the angle formed by the meeting of two rafters, and with struts to prevent sagging of the rafters. The feet of the rafters are tied together by the beam and are thus incapable of yielding in the direction of their length, so that their apex becomes a fixed point to which the beam is tied. Despite this simplest form of truss, the space beneath the rafters is occupied by unsightly structural members necessary to establish the fixed apex of the rafters, the rafters being hingedly related at said apex and not tied together as a beam. With the present invention it is an object to provide an arched beam in place of the usual truss, eliminating the complexity of the usual truss beam, king post and struts, thereby freeing the space beneath the rafters.

Each rafter of a roof truss is a beam in itself, but limited in this respect by the hinged joinder at the apex of the roof. Therefore, the alignment of one rafter with the other, at opposite slopes of the truss, cannot be relied upon as a continuous beam. However, with the present invention, it is an object to provide a coupler that attaches rafters at their apex so as to establish beam continuity from one to the other.

The coupling of the present invention, as it will be later described, has as its object flat plates to be secured to the rafter beams by a multiplicity of fasteners in shear. A feature is the overlap of rafter ends at the apex of these angularly related beams, the complementary plates having flat interface engagement with the beam end surfaces for the penetration of said fasteners to transfer shear loads between the beams and plates.

A characteristic of rafter relationship is the symmetry of beam angularity at the apex, or the equivalent by the bisection of the apex as when the roof pitch is different at opposite sides. Therefore, it is an object of this invention to provide a symmetrical coupling comprised of identical members that are complementary and one applied to the other when engaged with overlapped rafter beam ends. With the present invention, the coupling member is fabricated of a rectangular sheet of material perforated to receive shear fasteners and formed to establish an angle with a bearing plate engaged with one beam end and a flange plate engaged with the other beam end and to establish a strap plate that extends from said flange plate to embrace the bearing plate of the complementary coupling member and the said other beam end engaged on said complementary bearing plate. The aforesaid relationship of plates is identically the same when considering either coupling member.

A general object of this invention is to provide simple and practical coupling hardware for continuing one angularly related beam member into another. With the present invention, the two identical complementary members are fabricated of flat sheet material sheared partially along one line from a point that determines the bearing plate angle formation and the line of joinder thereto of the strap plate, the first mentioned "one line" being angularly displaced from the last mentioned "line of joinder" as determined by the beam angularity and/or roof pitch.

SUMMARY OF INVENTION

Figure 2:
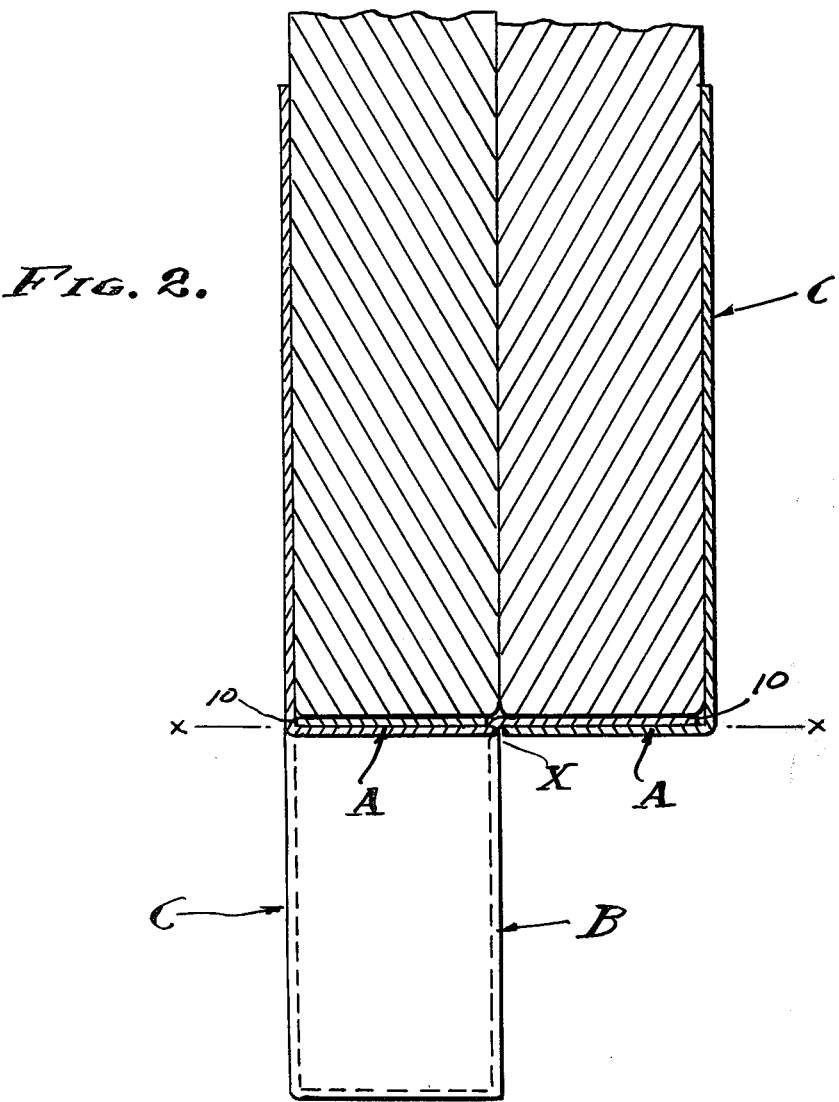

This invention relates to structural hardware adapted to establish an arch of two angularly related beams joined together at an apex. The hardware is in the nature of a coupling for load transmission between angularly related beam ends and is comprised of identical complementary members fabricated of sheet material to be secured in working position by a multiplicity of fasteners in shear. In accordance with this invention, each of the two coupling members is fabricated of a rectangular body of sheet material having a midpoint X spaced from what will be termed an outer edge 10, said point X determining the placement of a bend and shear line 11 disposed parallel from the edge 10 to establish a bearing plate A to engage the underside of one beam. The body is turned downward toward its one end 12 and is sheared toward its other end 13 to establish a flange plate B to engage the side of the other beam and so as to form a strap plate C. A feature is the integral joinder of strap plate C that is turned inward and then upward along parallel bend lines 14 and 15 angularly displaced from line 11 the total angularity of the two beam ends to be coupled. As shown, slope line 14 is the line of joinder between the flange plate B and strap plate C, the lines 14 and 15 being spaced to form an upwardly open channel to receive the other beam end and bearing plate A of the other complementary coupling member. With the strap channels of the two coupling members faced upwardly and one member rotated 180° with respect to the other, they are mated as shown in FIG. 2 of the drawings with the outer edges 10 disposed away from each other respectively.

DRAWINGS

The various objects and features of this invention will be fully understood from the following detailed description of the typical preferred form and application thereof, throughout which description reference is made to the accompanying drawings, in which: FIG. 1 is an elevational view of two angularly related beam ends joined together by the coupling of the present invention. FIG. 2 is an enlarged sectional view taken substantially as indicated by line 2—2 on FIG. 1. FIG. 3 is a flat pattern of one of the two identical coupling members involved in the coupling assembly. FIG. 4 is an end view of one of the coupling members prepared for assembly. FIGS. 5 and 6 are opposite side views of the coupling member and taken as indicated by lines 5—5 and 6—6 on FIG. 4. And, FIG. 7 is a view of the two coupling members as they appear assembled and ready for installation as shown in FIG. 1.

PREFERRED EMBODIMENT

Referring now to the drawings, it is significant that the complementary coupling members are identically fabricated without waste from rectangular sheet material, having an inside for interface engagement with overlapped angularly related beam ends, and having an outside for accessible application of fasteners. Accordingly, the flat pattern for the coupling member comprises the outer edge 10, the up-slope end 12 and the down-slope end 13, and incidentally the edge 16 opposite edge 10. The midpoint X is placed according to the thickness of the beam ends to be coupled, and the depth of the beams will determine (according to strength required) the length required of the rectangle edges 10 and 16. As shown, the bend and shear line 11 is coincidental with point X and spaced parallel to and inward from outer edge 10 a distance equal to the beam thickness to be engaged thereby at the inside interface. In practice, a relief opening 17 surrounds the midpoint X and from which the sheet is sheared along line 11 toward the down-slope end 13, and then the sheet is turned down toward up-slope end 12 and inward from the outer edge so as to form an angle cross section engageable with the two overlapped beam ends. That is, the outer edge margin remains to form the bearing plate A while the turned and/or downwardly bent portion forms the flange plate B.

A feature of this coupling member is its embracement of the bearing plate A of the complementary coupling member mated therewith, and to this end the line of joinder 14 extends from point X toward the up-slope end 12 with an angular displacement from line 11 equal to the angularity of the beam ends to be coupled. The strap plate C is then turned or bent inwardly from the slope line of joinder 14, and then turned or bent upwardly along the line 15 spaced parallel from line 14 a distance to receive the bearing plate A of the complementary coupling member mated therewith. Thus, the strap plate C becomes a channel that embraces a beam end with the bearing plate A of the other complementary coupling member captured therein.

As best illustrated in FIGS. 1 and 2 the beam ends are angularly related and overlapped with their interfaces engaged. However, prior to application of the coupling members to said beams, two identical coupling members are mated as shown in FIG. 7, employing said two members as they are shown disposed in FIGS. 5 and 6 respectively. That is, the two coupling members are first nested together and rotated into mated position with their midpoints X and X coincidental one with the other, thereby establishing a transverse hinge line x—x (see FIG. 2) through the overlapped bearing plates A and A of the two members respectively. In practice, this coupling assembly can be secured together as by means of spot welding, and used as a coupling unit when offered upwardly into working position with the aforementioned angularly related beam ends. The coupling members formed as hereinabove described will have interface engagement with exposed beam surfaces throughout the full areas of each of the plates thereof A, B, and C. Structural connection is then established by applying normal fasteners from the outside of the plates and into the end portions of the beams so as to act in shear, placed substantially as shown and of a type and size as circumstances require.

From the foregoing it will be seen that the coupling member fabrication is simple and relatively inexpensive. The assembly thereof is quite unobvious but readily accomplished, there being but one possible mated relationship of the two identical members. And structural installation is then quite obvious, since the hinge line x—x through the mated bearing plates A and A is the apex line at the lower edges of the crossed beam ends which inherently fall into place and into working position preparatory to applying the plate fasteners that couple the two beams into a stable arch adapted to withstand loads commensurate with the total span of the composite beams employed. Significantly, the bearing plates A of the two members are fastened in shear relative to each other by the fasteners engaged therethrough.

Having described only typical preferred forms and applications of my invention, I do not wish to be limited or restricted to the specific details herein set forth, but wish to reserve to myself any modifications or variations that may appear to those skilled in the art:

I claim:

1. A coupling for establishing structural continuity between the overlapped ends of two angularly related beams and comprising; identical complementary members to be fastened to said beam ends respectively and each fabricated from a sheet of material having a midpoint spaced from an outer edge a distance to receive the thickness of one beam end to be engaged thereby, said sheet having an up-slope end and a down-slope end, there being a bend and shear line disposed through said midpoint and parallel with said outer edge, the sheet being sheared along said line from said midpoint to said down-slope end and bent downwardly along said line from said midpoint to said up-slope end, there being a slope line disposed from said midpoint downwardly at an angle toward said up-slope end and along which line the sheet is bent inwardly and then upwardly along a bend line parallel to and spaced from the slope line a distance to receive the thickness of the other beam end to be engaged thereby, the two members being nested together with their midpoints coincidental and their outer edges faced oppositely and with the slope line of one member coincidental with the shear portion of the first mentioned line of the other member.

2. The beam coupling as set forth in claim 1, wherein each of said bends is at a right angle.

3. The beam coupling as set forth in claim 1, wherein the shear and bend along the line through the midpoint define a bearing plate between said line and the outer edge of the sheet to have interface engagement with the bottom edge of the beam end deposed thereon.

4. The beam coupling as set forth in claim 1, wherein the bend portion of the first mentioned line and angular slope line define a flange plate to have interface engagement with the inner of the other beam end.

5. The beam coupling as set forth in claim 1, wherein the slope line and bend line parallel thereto define a strap plate of channel formation to embrace the other beam end.

6. The beam coupling as set forth in claim 1, wherein the shear and bend along the line through the midpoint define a bearing plate between said line and the outer edge of the sheet to have interface engagement with the bottom edge of the beam end deposed thereon, and wherein the bend portion of the first mentioned line and angular slope line define a flange plate to have interface engagement with the inner of the other beam end.

7. The beam coupling as set forth in claim 1, wherein the shear and bend along the line through the midpoint define a bearing plate between said line and the outer edge of the sheet to have interface engagement with the bottom edge of the beam end deposed thereon, wherein the bent portion of the first mentioned line and angular slope line define a flange plate to have interface engagement with the inner of the other beam end, and wherein the slope line and bend line parallel thereto define a strap plate of channel formation to embrace the other beam end.

8. The beam coupling as set forth in claim 1, wherein the shear and bend along the line through the midpoint define a bearing plate between said line and the outer edge of the sheet to have interface engagement with the bottom edge of the beam end deposed thereon, wherein the slope line and bend line parallel thereto define a strap plate of channel formation to embrace the other beam end, and wherein the inturned portion of the channel of one member is fastened to the bearing plate of the other member, respectively, by shear engagement.

9. The beam coupling as set forth in claim 1, wherein the shear and bend along the line through the midpoint define a bearing plate between said line and the outer edge of the sheet to have interface engagement with the bottom edge of the beam end deposed thereon and secured thereto by fasteners in shear.

10. The beam coupling as set forth in claim 1, wherein the shear and bend along the line through the midpoint define a bearing plate between said line and the outer edge of the sheet to have interface engagement with the bottom edge of the beam end deposed thereon, wherein the slope line and bend line parallel thereto define a strap plate of channel formation to embrace the other beam end, and wherein the inturned portion of the channel of one member is fastened to the bearing plate of the other member, respectively, by shear fasteners engaged therethrough and into said beam ends respectively.

11. The beam coupling as set forth in claim 1, wherein the shear and bend along the line through the midpoint define a bearing plate between said line and the outer edge of the sheet to have interface engagement with the bottom edge of the beam end deposed thereon and secured thereto by fasteners in shear, wherein the bent portion of the first mentioned line and angular slope line define a flange plate to have interface engagement with the interface of the other beam end and secured thereto by fasteners in shear, and wherein the slope line and bend line parallel thereto define a strap plate of channel formation to embrace the other beam end and secured thereto by fasteners in shear.

* * * * *